April 17, 1962  B. OSTROV ET AL  3,030,619
HIGH SPEED PRECISION CURRENT SWITCHING SYSTEM
Filed Oct. 14, 1959  4 Sheets-Sheet 1

INVENTORS.
BERNARD OSTROV
PAUL NEUWIRTH
BY *William X. Pearce*
ATTORNEY

INVENTORS.
BERNARD OSTROV
PAUL NEUWIRTH

BY William V. Pesce

ATTORNEY

INVENTORS.
BERNARD OSTROV
PAUL NEUWIRTH

April 17, 1962  B. OSTROV ET AL  3,030,619
HIGH SPEED PRECISION CURRENT SWITCHING SYSTEM
Filed Oct. 14, 1959  4 Sheets-Sheet 4

INVENTORS.
BERNARD OSTROV
PAUL NEUWIRTH
BY *William V. Pence*
ATTORNEY

United States Patent Office 3,030,619
Patented Apr. 17, 1962

3,030,619
HIGH SPEED PRECISION CURRENT SWITCHING SYSTEM
Bernard Ostrov, Brooklyn, and Paul Neuwirth, New York, N.Y., assignors to Autometric Corporation, New York, N.Y., a corporation of Delaware
Filed Oct. 14, 1959, Ser. No. 846,339
7 Claims. (Cl. 340—347)

This invention relates to high speed current switching systems and is particularly directed to systems for accurately switching a fixed or determinable amount of stabilized current into a plurality of different valued load impedances at high rates of speed without any deterioration of the current stability or deviation from its fixed or determinable value.

High speed current switching systems for switching relatively constant and stabilized currents into various types of loads and/or impedances for different reasons presently utilize certain types of switches for switching the currents into the various type of loads. In the past, the switches themselves for switching the currents, be they either mechanical or electrical, always invariably introduced certain types of errors in the magnitude and/or phase of the current being switched so that ultimately errors were introduced into the overall system. The prior art encompassed a certain number of different type switches such as relays which, for very high frequency switching were inadequate because of the inertia of the moving parts, as for example, failure of the moving elements to follow the proper and normal timing sequence of some particular switching function. Relays also have a very limited life and the terminal capacities thereof hinders high frequency operation. Another limiting factor in the use of relays is the difficulty involved in providing proper and adequate isolation from the switching or keying potentials. Another type of relatively high speed current switch is the gaseous discharge device called the thyratron tube. Here the limiting factor is the incapability of the thyratron to perform at very high operating speeds since they are limited by some definite finite ionization and de-ionization time. Also since the thyratron device possesses extremely high noise content, the use thereof would produce a considerable amount of noise in the system. This condition would introduce certain errors not acceptable. Still another type of switch utilized in high speed current switching systems is the transistor. Since transistors do not possess the high back resistance in the type of switching operations contemplated by the instant invention, and since they also present a finite open switch impedance of less than one megohm they cannot accurately be used. Transistors also have a certain finite current generated or developed in the base emitter, and collector electrodes which become part of the load current and, therefore, produce an error in the overall system.

To overcome such limitations in high speed switching systems, a novel vacuum tube arrangement has been devised and means for utilizing such arrangements for accurately switching stabilized currents into the loading systems. It is, therefore, a principal object of the invention to provide an accurate high speed current switching system producing minimum errors in the stabilized currents switch into the various load impedances.

Another object of the invention is to provide a high speed current switching system utilizing switches which are not limited by the inertia of the moving elements, or limited by the finite ionization and de-ionization times.

Still another object of the invention is to provide a high speed current switching system for converting a decimal digital system to an analog system.

These general objects as set forth and other objects will become more apparent from the following specifications when taken with the following drawings and wherein;

FIG. 7b shows a stepped-type sinusoidal wave form produced in accordance with the system shown in FIG. 7a.

In describing the invention, it will be advantageous to utilize the same reference numerals or letters to indicate like or similar parts, thus simplifying and facilitating the understanding of the invention.

Figure 1:
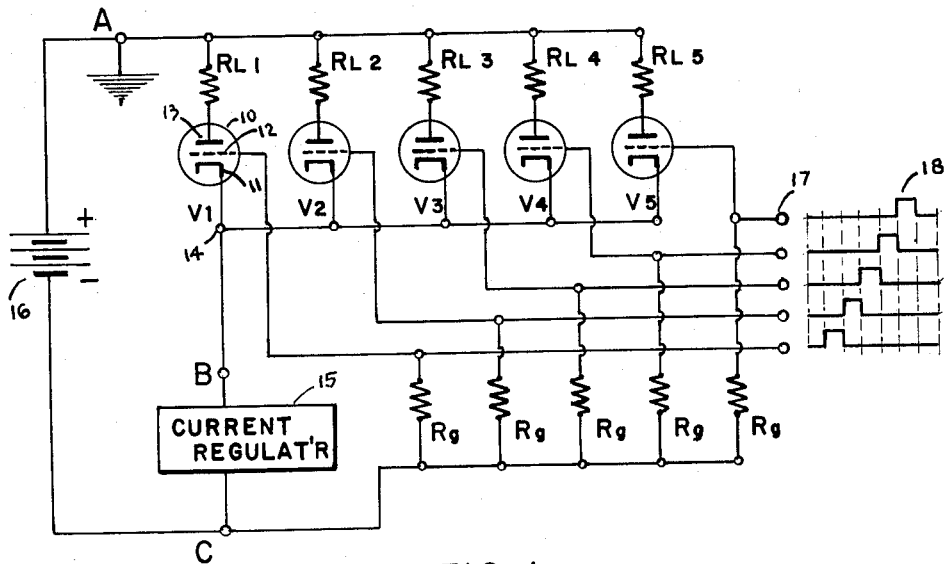
FIG. 1 is a circuit diagram showing one embodiment of the high speed current switching system according to the invention.

In FIG. 1, which represents one circuit configuration of the invention, there is shown a series or plurality of electron discharge devices or tubes 10 each having a cathode 11, grid 12, and anode 13, associated therewith. Each of the anodes 13 includes in their respective load circuits, loading resistor $R_L1$, $R_L2$, $R_L3$, $R_L4$, $R_L5$ and so on depending upon the number of switching tubes used, the said loading resistors having absolute values different from each other. The cathodes 11 of each of the tubes 10 have their output terminals $V_1$, $V_2$, $V_3$, $V_4$ and $V_5$ commonly connected to an output terminal B of a constant current regulator 15. The constant current regulator 15, as shown in FIG. 1, is a commercially available item and the state of the art in the design thereof is such that high stability in the area of 0.001% is obtainable over a fairly wide range of loads with an accuracy of 0.1%. Also, the rise time when switching the regulator from load-to-load is in the order of 20-microseconds. Such regulators are available for delivering currents at least from 0.1 milliampere up to 1 ampere and perhaps more. It is these regulators in combination with the circuitry and tubes applicable thereto that give rise to the present invention. The other output C from the regulator 15 is connected to a source of electric potential 16 at the negative side thereof, the positive side of the said potential source being tied to a point of reference potential A, in this particular instant ground. Each of the grid electrodes 12 of the tubes has connected thereto a grid-leak resistor $R_g$ connected from the respective grids of each tube to the output terminal C of the regulator. All of the anode loading resistors $R_L$ are commonly connected at their extremities, with the commonly connected point being attached to the reference potential point A or ground. Each of the control grids 12 have connected thereto an input terminal 17 to which an input signal 18 is transmitted from an external exciting source. The signal 18 as shown in FIG. 1 is of the pulse type, but other type keying or timing signals may be used.

Figure 2A:
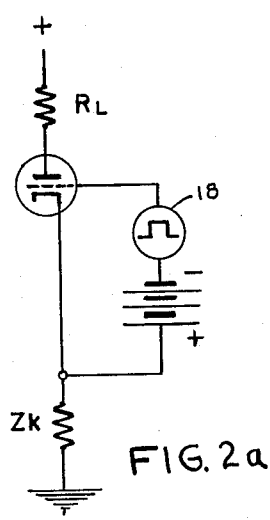
FIGS. 2a and 2b show simple one stage circuit diagrams of two separate means of operation in which the current switching system of FIG. 1 is used.
Figure 2B:
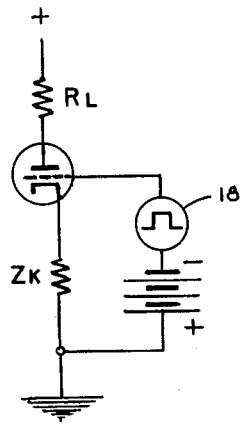
Figure 3:
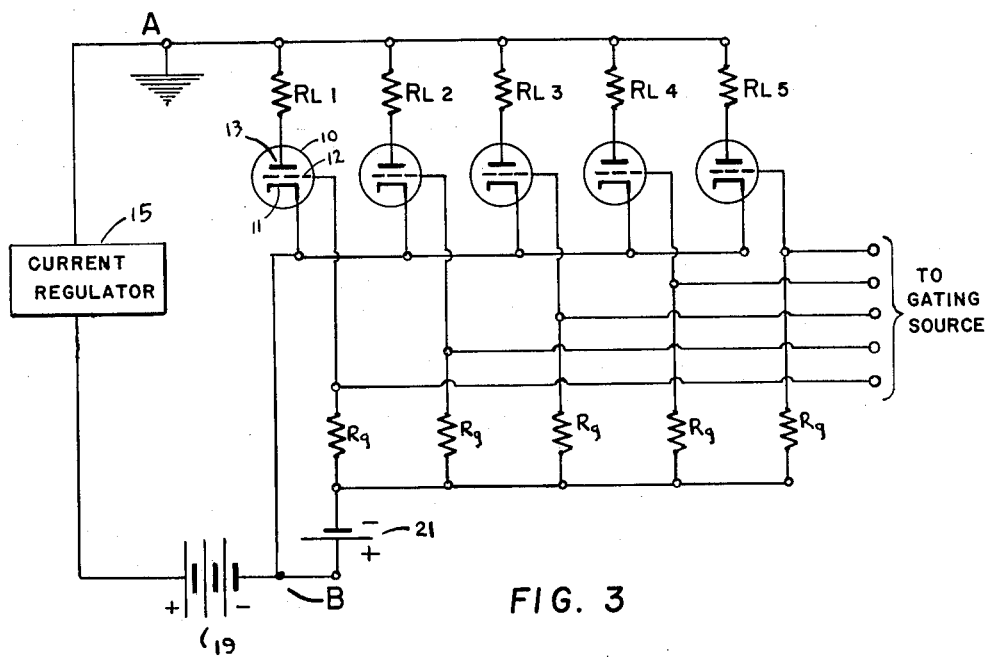
FIG. 3 shows still another embodiment of the invention permitting a different mode of operation and wherein no grid current will effect the accuracy of the load currents.

The circuit of FIG. 1 operates in the following manner, the tubes 13 are generally all in a non-operative condition, that is to say that all are cut-off, there being no current flow through the respective anode circuits in the absence of any keying or exciting signal. This condition is brought about by the relative negative biasing of the grid electrodes as determined by the source potential 16 and the manner in which it is connected to the anode and cathode electrodes, and the gating signal source quiescent voltages. The tubes are made to conduct by applying a positive keying signal 18 sufficient to overcome the biasing cut-off condition previously described. The gating signal 18 may be a series of pulses transmitted in a certain time sequence as developed by a ring-type counter, a gas decade counter, a magnetic beam switching tube, and the like. When the tube is in its operative state, that is to say conductive, the current flow therethrough will be determined by the current regulator 15. If the current regulator is set for 1 milliampere, that will be the current flow through the tube and load resistor $R_L$. If the regulator is set for two milliamperes then that will be the load current and so on. In the particular case, illustrated by FIG. 1, the amplitude of the positive going gating pulse 18 necessary to drive the tube to conduction is a function of the impedance of the cathode circuit or the current regulator bias in the said cathode circuit. FIG. 2b is an equivalent diagram of one switch stage of the circuit of FIG. 1, where $Z_k$ represents the impedance of the regulator. However, since $Z_k$ of necessity must be high so that good regulation will result, then it follows that the voltage across this impedance will be high. This high voltage across the cathode produces a high biasing potential and thus makes it necessary to have very large gating signals to overcome this high biasing condition. However, with large signals necessary to overcome the high cut-off biasing voltages there is a possibility that the tubes may be made to operate in the grid-current region thus causing the grid to draw current. This current will then add to the regulator current, since the regulator is in the grid current loop, and there will then be in the load circuit an erroneous load current. To avoid the use of large gating signals, a circuit as shown in FIG. 3 was devised.

In FIG. 3 there is again shown a plurality of electron discharge devices or devices as in FIG. 1 with each of the devices having a cathode 11, grid 12, and anode 13 associated therewith. Here again all the cathodes 11 are commonly connected and attached to an output terminal B which forms a part of a negative side of a potential source 19, the positive side thereof being connected to the regulator 15. The anode load resistors $R_L$ in each of the anode circuits again have their extremities commonly connected to a source of reference potential A, again this reference or datum point being ground. The other side of the regulator is also connected to this reference point A. In addition to the anode-cathode potential source 19 there is included a grid-biasing source 21 having a positive side thereof connected to the terminal B and the negative side connected to the grids of the tubes through their respective grid loading resistors $R_g$. In this particular type circuit the current regulator is not in the grid-current loop, hence, there will be no very large gating signals necessary to overcome the large biasing potential previously produced across the high regulator impedance. FIG. 2a is an equivalent diagram of one stage of the circuit shown in FIG. 3. The gating signal 18 is applied directly between the grid and cathode electrodes so that regardless of the switching amplitude, as long as it is enough to turn the tube on, the load current will always be accurately maintained since none of the grid current forms a part of the regulator circuit.

Figure 4:
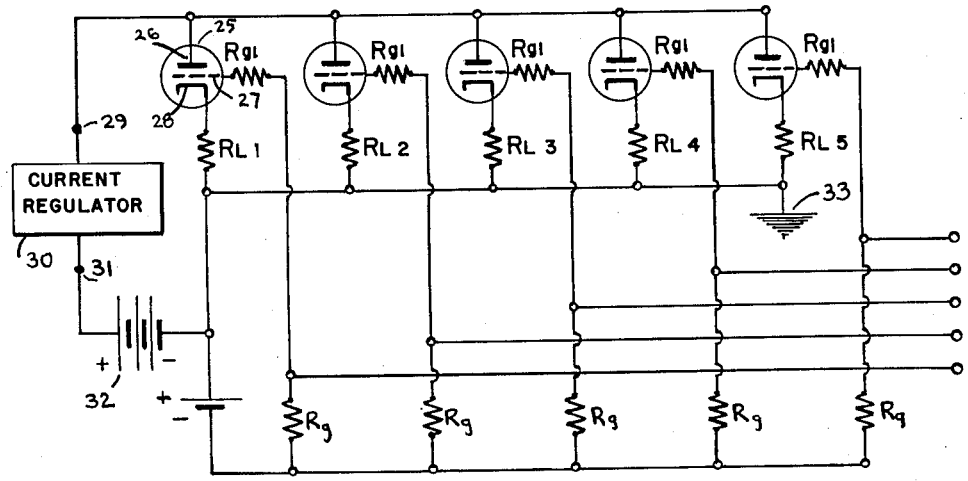
FIG. 4 shows still another circuit embodiment of the invention, but with the respective load impedances in the cathode circuit to produce an output signal in opposition to the signal produced by the embodiments shown in FIGS. 1 and 3.

FIG. 4 shows still another embodiment of the invention when currents flow in the opposite direction with respect to the load reference. More specifically FIG. 4 shows a plurality of electron discharge devices or tubes 25 each having an anode 26, grid 27 and cathode 28 associated therewith, with the respective load resistors $R_L$ in each of the cathode circuits. The plate anodes 26 of each of the tubes are commonly connected to one terminal 29 which forms the output of current regulator 30, the other terminal 31 of the regulator being connected to the positive terminal of potential source 32. The cathode load resistors $R_L$ are also commonly connected at their extremities to a common reference potential or ground 33. The particular configuration shown in FIG. 4 requires a fairly high amplitude gating signal to overcome the large biasing potential resulting from the load impedance $R_L$ in the cathodes. To prevent any appreciable grid currents from causing errors in the regulator load currents, grid limiting resistors $R_{gl}$ are placed between the grid electrodes and the grid-leak resistors $R_g$ to limit the amount of grid current flow. It has been found by experience that where the grid current in a 10 milliampere switching system was limited to 10 microamperes the error resulting therefrom would be less than 0.1%. It may be appreciated here that although electron tubes of the triode type have been illustrated in those circuit configurations where grid current is not a factor in producing errors in the load circuits, electron tubes of the multigrid type may also be used such as tetrodes and pentodes to give the same switching effect as the triodes. However, care must be taken to prevent errors that may be caused by screen or other electrode currents.

Figure 5:
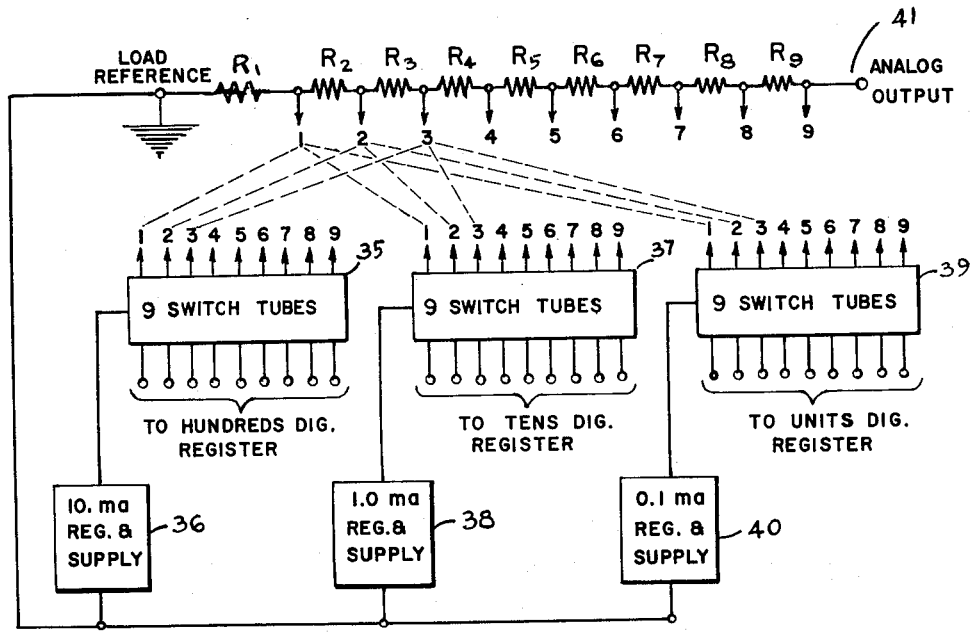
FIG. 5 illustrates one practical application of the invention as embodied by FIGS. 1, 3 and 4 in a typically three digit system for a decimal digital-to-analog conversion.

The high speed switching circuits illustrated in FIGS. 1–4 may find usefulness in a decimal digital-to-analog conversion system such as that shown in FIG. 5. Here information may be available in a numerical form and it may be desirable to convert such information into some continuous function necessary to drive a certain physical system such as a machine tool or to simulate some particular movement of a military object and the like. In particular, FIG. 5 shows a typical three digit system when the decade switching groups are shown in block form, there being nine switch tubes to each group. Group 35 has associated therewith a 10 milliampere regulator 36, group 37 a 1.0 milliampere regulator 38, and group 39 a 0.1 milliampere regulator 40. Group 35 is energized from some hundreds digit register, group 37 energized from a tens digit register and finally group 39 energized from a units digit register, the energizing source for all three units emanating from some storage source where the digits representing the particular work function has been stored such as a magnetic drum, punched cards or tape and the like. The load circuit of the three switching groups is the same, the total load consisting of 9 resistors R, through $R_g$ each having the same value with each switching group having its corresponding output connected to the corresponding terminal of the load group. For example, in group 35, the output terminal 1, corresponding to the first of nine stages is connected to the load terminal 1, thereby placing only one load resistor $R_1$ in the load circuit. This means that when stage 1 of group 35 is switched on, 10 milliamperes will flow through the load resistor $R_1$. Likewise in group 35 all of the other output terminals 2–9 are connected to the corresponding numbered load resistor terminals. In groups 37 and 39 the situation is the same with all output terminals connected to the corresponding load resistor terminal. Now taking a representative case, if the desired output were an analog representation of the number 263, and if the load resistors R were each 1000 ohms, then by energizing the corresponding switch tubes in the respective decade groups the output at the analog output terminal 41 would be 26.3 volts. In other words, 10 milliamperes would flow through 2000 ohms of the hundreds register or $R_1+R_2$ representing 20 volts, 1 milliampere would flow through 6000 ohms through the tens register or $R_1$ through $R_6$, representing 6 volts, and finally 0.3 milliamperes through 3000 ohms, or $R_1+R_2+R_3$ to give 0.3 volt. The summation of the voltage drops resulting from the total current flow through the respective load resistors is the output voltage as seen at the analog output and is the functional representation of the digital information processed through the switching system. It is possible to visibly observe the analog output function by feeding the resulting signal to a cathode ray tube oscilloscope or some other similar type instrument. To perform digital-to-analog conversion when binary rotation is used, only one load resistor is required, but a separate regulator and switch tube is needed for each binary digit desired. To enlarge upon the capabilities of the switching system shown in FIG. 5, which in effect produces an output signal having only a positive direction, another circuit as shown in FIG. 6 is provided which is capable of producing a bi-directional output signal.

Figure 6:
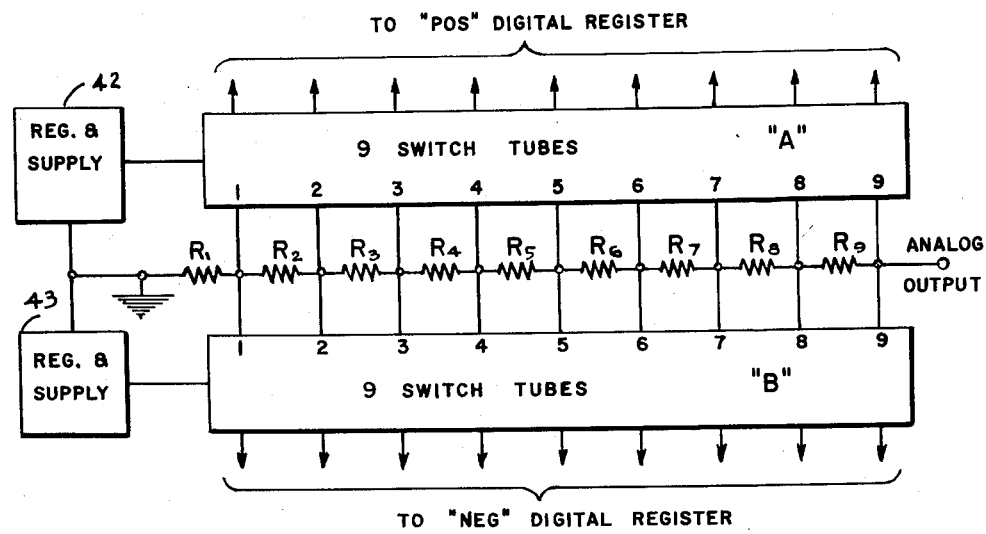
FIG. 6 shows still another application of the invention in a typically bi-directional decade type system utilizing the embodiment of FIGS. 1 or 3 in one switching system and the embodiment of FIG. 4 in another switching position to give output signals of a positive and/or negative polarity.

FIG. 6 shows essentially a bi-directional switching system according to the invention embodied herein and in particular shows a switching system "A" similar to that shown in FIGS. 1 and 3 producing a positive going output signal and a system "B" producing a negative going signal. The energizing signal for the "A" switching group is taken from a positive digital register and for the "B" switching group is taken from a negative digital register. The output terminals 1 through 9 of each of the switching groups "A" and "B" are correspondingly connected to the load impedance terminals R having the same subscript numbers so that either regulator 42 or 43 may be switched depending upon the polarity of the keying digit signal.

Figure 7A:
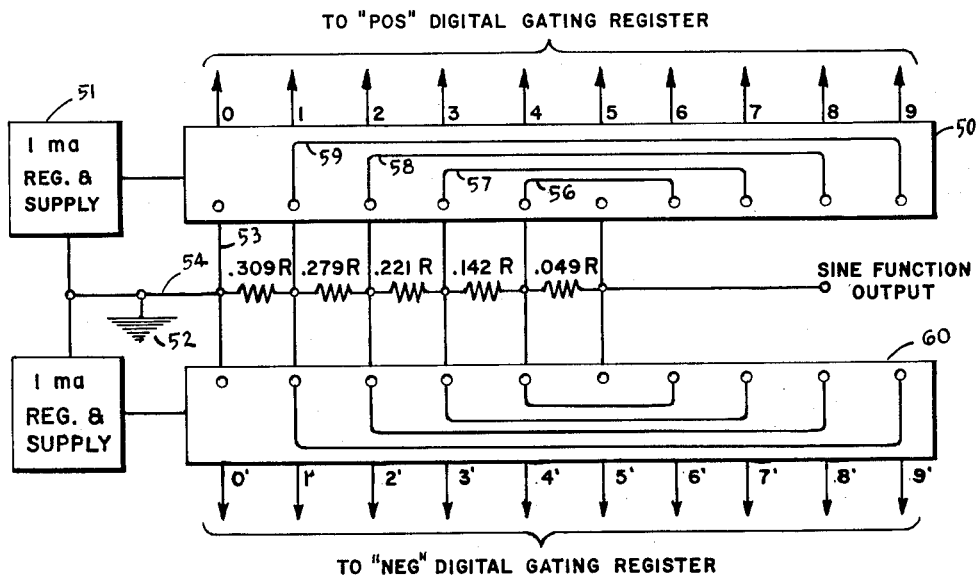
FIG. 7a shows a modified system of FIG. 6 and how the sequentially gated switching circuits can be used to generate a particular time function in accordance with predetermined digital gating register signals when applied to the load circuit.

The circuit of FIG. 5 as modified by the circuit of FIG. 6 can be used as a generator for producing some function of time. Although this particular configuration is not shown, it is brought about by merely showing the configuration of FIG. 6 as an addition to each of the groups of FIG. 5. By sequentially gating the groups of switches, going from say −999 to zero and up to +999, a 1999 step linear staircase waveform is generated, thus by digitally programming the switch registers from some external source such as a magnetic or punched tape, any desired wave form can be generated. In this particular illustration the resolution of the generated waveform is limited to one part in 2000, but an addition of one more decade will improve this by a factor of 10. Further variations may be achieved by re-arranging and re-evaluating the switching configurations and load impedances. FIG. 7a shows for example, how a sine function generator having resolution of one part in twenty would be constructed.

Figure 7B:
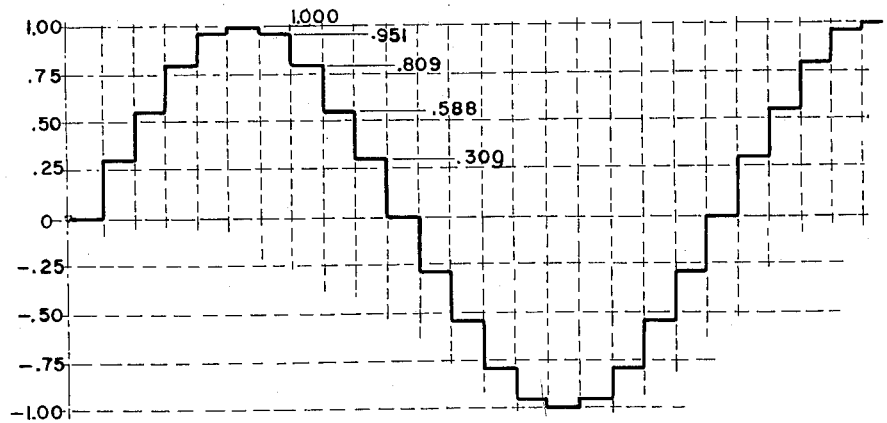

In particular, FIG. 7a shows the same grouping arrangement as shown in FIG. 6 with certain modifications in the load impedance and the stage switches to give an output signal comparable to the one illustrated in FIG. 7b. For example, sequentially gating the switch group 50 with the 1 milliampere supply 51, when zero (0) switch is turned on the current will go directly to ground via conductors 53 and 54 respectively. This is indicated by the curve in FIG. 7b, when during the first gating pulse period the voltage is zero. Continuing with the positive digital gating register, the number 1 switch is turned on or gated during the next gating period so that the 1 milliampere of current flows through the 0.309R load impedance via conductor 54 to produce a positive voltage there across equal to 0.309, again indicated upon the curve diagram of FIG. 7b in a positive direction. Gating the number two (2) switch puts the regulator current through the .279R and .309R load impedance via conductor 55 so their sum now being equal to 0.588 volts and so indicated in the voltage-time diagram of FIG. 7b. This process continues up to switch 5 where the voltage drop across the total number of load resistors is a maximum, the illustrated case being unity. Continuing with the positive gating register, the next gating pulse excites switch 6, but the current through this switch is by-passed, via conductor 56, so as to pass the current through the first four load resistors, these being 0.309R, .279R, 0.221R, and 0.141R. In this manner, switch position 6 is the same or equivalent to the switch position 4, and the voltage drops the same in both positions. Conductors 57, 58 and 59 in a manner similar to conductor 56 places switches 7, 8 and 9 in the same respective position with regard to the load impedances as switches 3, 2, and 1. Hence, in gating sequentially the switches 1 to 9 respectively, a positive stepped-type one-half sinusoidal wave form is produced. To produce the negative half of the stepped-type sinusoidal wave form, another switching group 60 is used, but disposed to produce a negative going voltage. Here again the gating pulses are of equal width and adapted to be available from a negative digital gating register of the kind used with respect to the positive register. Proceeding again to sequentially gate the switch group 60, going from 0' to 9' respectively, a negative going one-half sinusoidal typed; stepped wave is produced similar to that shown in FIG. 7b. Although the gating pulses for the foregoing illustration were all of equal time duration or width, it is possible to produce the sine-wave effect by using load impedances R all of equal value and having the time duration or pulse widths varied in such a manner, as emanating from the digital gating register, to produce the said same sinusoidal wave form or effect.

The present invention lends itself to many other applications and devices, as for example, if current regulators may be produced having an output current proportioned to an input voltage:

where, $Io = KEin$
$Io$ = the output regulator current
$Ein$ = the input voltage to the regulator,
$K$ = a constant and FIG. 6 contained such variable regulators, then, energizing No. 7 gate for example, would give an output voltage of $(KEin)(7R)$. Hence, multiplication of an analog quantity by a digital quantity has been accomplished. This type of action can be extended for more digits and other codes. Carrying this idea still further, it would be possible if two units were used, the analog output of one feeding the input of another digital by digital multiplication could be performed with the resultant in analog. The invention may find application as an integration or variable sweep generator by taking the loading impedances R and replacing them with capacitors.

Although certain preferred embodiments of the invention have been illustrated, it will be obvious to those skilled in the arts to which the invention pertains that many other modifications may be made without departing from the spirit or scope of the invention.

Having described the invention what is claimed is:

1. A high speed current switching system for switching fixed currents into a plurality of load impedances comprising in combination a plurality of electron discharge devices in a normally non-conductive state, each of the said devices having an anode, cathode and grid electrode, the said cathodes having a common terminal point, a constant current regulator source having a pair of output terminals and wherein one of the said terminals is connected to the cathode common terminal point, grid impedance means connected between each of the said grid electrodes and the other said regulator output terminal, anode impedance means connected between each of the said anode electrodes and a source of reference potential and electrical signal means connected to the said grid electrodes and disposed to excite the said electron discharge devices in a pre-determined timing sequence and cause the said tubes to conduct and to permit the constant current of the said regulator to pass through the said anode impedance means in accordance with the said timing sequence.

2. A high speed current switching system for switching fixed currents into a plurality of load impedances comprising in combination a plurality of electron discharge devices in a normally non-conductive state, each of the said devices having an anode, cathode and grid electrode, the said cathodes all connected together and having a common terminal point, a constant current regulator source having a pair of output terminal points, a constant current regulator source having a pair of output terminal means and wherein one of the said terminal means is connected to the cathode common terminal point, grid impedance means connected between each of the said grid electrodes and the said regulator output terminal, anode impedance means connected between each of the said anode electrodes and the other output regulator terminal means, the said terminal means being connected to a source of reference potential, and electrical signal means connected across the said grid electrodes and the cathode common terminal point and disposed to excite the said electron discharge devices in a pre-determined timing sequence and cause the said tubes to conduct and to permit the constant current of the said regulator to pass through the said anode impedance means in accordance with the said timing sequence in a positive direction.

3. A high speed current switching system for switching fixed currents into a plurality of load impedances comprising in combination a plurality of electron discharge devices in a normally non-conductive state, each of the said devices having an anode, cathode and grid electrode, the said anodes all connected together and having a common terminal point, a constant current regulator source having a pair of output terminal means and wherein one of the said terminal means is connected to the anode common terminal point, grid impedance means connected between each of the said grid electrodes and the other said regulator output terminal means, cathode impedance means connected between each of the said cathode electrodes and the said other regulator output terminal means, and electrical signal means connected between the said grid electrodes and the said other output terminal and disposed to excite the said electron discharge devices in a pre-determined timing sequence and cause the said tubes to conduct and to permit the constant current of the said regulator to pass through the said cathode impedance means in accordance with the said timing sequence in a negative direction.

4. In a high speed current switching system for converting a series of stored digital numbers into an analog representation thereof, the combination comprising a plurality of switching sections each consisting of a grouping of nine consecutively numbered electron tubes in a quiescent state and each having a correspondingly numbered output terminal, constant current regulator means associated with each switching section and disposed to permit the current thereof to flow through the said tubes in a positive direction when in a conductive state, a sectionally divided load impedance having a series of consecutively numbered input terminals each connected to the said correspondingly numbered electron tube output terminal and disposed to receive the said regulator current, the said impedance also having an output terminal at one extremity, the other extremity being connected to a source of reference potential, and means for producing electrical signals indicative of the stored digital numbers the said signals being disposed to excite the said discharge tubes in a predetermined timing sequence to cause the said tubes to conduct and to permit the regulator current of each section to pass through the respective tubes and the correspondingly numbered load impedance section to produce an analog output signal at the output terminal of the load impedance indicative of the digital input signal.

5. In a high speed current switching system according to claim 4 and wherein the regulator current is disposed to flow in a negative direction in response to the digital signal causing the excitation of the said tube.

6. In a high speed current switching system for converting a series of stored digital numbers into an analog representation thereof, the combination comprising a plurality of switching sections each consisting of a grouping of consecutively numbered electron tubes in a quiescent state and each having a correspondingly numbered output terminal, constant current regulator means associated with each switching section and disposed to permit the current thereof to flow through the said tubes when in a conductive state, a sectionally divided load impedance having a series of consecutively numbered input terminals each connected to the said correspondingly numbered electron tube output terminal and disposed to receive the said regulator current, the said impedance also having an output terminal at one extremity, the other extremity being connected to a source of reference potential, and means for producing electrical signals indicative of the stored digital numbers the said signals being disposed to excite the said discharge tubes in a predetermined timing sequence to cause the said tubes to conduct and to permit the regulator current of each section to pass through the respective tubes and the correspondingly numbered load impedance section to produce an analog output signal at the output terminal of the load impedance indicative of the digital input signal.

7. In a high speed current switching system for converting a series of stored digital information into an analog representation thereof, the combination comprising a plurality of switching sections each consisting of a series of consecutively numbered electron tubes in a quiescent state and each having a correspondingly numbered output terminal, constant current regulator means associated with each switching section and disposed to permit the current thereof to flow through the said tubes when in a conductive state, load impedance means including a non-uniformly divided load impedance having a series of consecutively numbered, spaced input terminals, associated therewith and each connected to the said correspondingly numbered electron tube output terminal and disposed to receive the said regulator current, the said impedance also having an output terminal at one extremity, the other extremity being connected to a source of reference potential, and means for producing electrical signals indicative of the stored digital information the said signals being disposed to excite the said discharge tubes in a predetermined timing sequence to cause the said tubes to conduct and to permit the regulator current of each section to pass through the respective tubes and the correspondingly numbered non-uniformly divided load impedance section to cause non-uniformly voltage distribution there-across and to produce an analog output signal at the output terminal of the load impedance of the digital input information signal.

References Cited in the file of this patent

UNITED STATES PATENTS 2,658,139 Abate _____ Nov. 3, 1953